United States Patent [19]

Molvar

[11] 4,157,304
[45] Jun. 5, 1979

[54] AERATION METHOD AND SYSTEM
[75] Inventor: Allen E. Molvar, Barrington, R.I.
[73] Assignee: Clevepak Corporation, White Plains, N.Y.
[21] Appl. No.: 863,588
[22] Filed: Dec. 22, 1977
[30] Foreign Application Priority Data
Nov. 22, 1977 [JP] Japan .................. 52-140555
[51] Int. Cl.² .............................. B01F 3/04; C02C 1/08
[52] U.S. Cl. ......................... 210/220; 210/242 A; 261/76; 261/DIG. 75
[58] Field of Search ................. 210/14, 15, 60, 63 R, 210/194, 220, 221 R, 242 A; 239/428.5; 261/76, 79 A, DIG. 75, DIG. 78; 366/167, 174

[56] References Cited
U.S. PATENT DOCUMENTS

| 2,447,123 | 8/1948 | Jones | 239/428.5 X |
|---|---|---|---|
| 2,548,725 | 4/1951 | Justis | 239/428.5 X |
| 3,365,178 | 1/1968 | Bood | 261/DIG. 75 |
| 3,430,823 | 3/1969 | Hunsaker | 239/428.5 X |
| 3,653,641 | 4/1972 | Eron | 210/242 X |
| 3,671,022 | 6/1972 | Laird et al. | 210/220 X |
| 3,761,065 | 9/1973 | Rich et al. | 261/76 |
| 3,954,921 | 5/1976 | Yoshida et al. | 261/DIG. 75 |
| 4,044,079 | 8/1977 | Tveit | 261/DIG. 75 |
| 4,112,025 | 9/1978 | Wilson et al. | 261/29 |

FOREIGN PATENT DOCUMENTS
1517502 11/1970 Fed. Rep. of Germany ... 261/DIG. 75

Primary Examiner—Robert H. Spitzer
Attorney, Agent, or Firm—Cushman, Darby & Cushman

[57] ABSTRACT

An improved method and system for mixing gas with waste water in which the water is pumped through a plurality of mixing chambers into which the gas is injected at a step surface to form parallel streams of gas and water. An extending chamber contains the parallel streams as the interface between them becomes unstable, breaks down creating vortices and produces tiny bubbles which mix with the water. The extending chamber is tapered inwardly to permit operation at higher air flow rates without blowing the bubble forming vortices out of the chamber. Helical vanes are preferably provided in the passages which inject the air into the extending chamber to create better wave generating conditions to extend the range to greater air flow rates.

12 Claims, 8 Drawing Figures

AERATION METHOD AND SYSTEM

BRIEF DESCRIPTION OF THE INVENTION AND SUMMARY OF THE INVENTION

The invention relates to an improved method, and submerged system for efficiently mixing gas with waste water.

Industrial waste, sewage and the like are commonly purified by pumping the liquid into a large pond, tank or basin where a bacteria population consumes the inorganic and organic material. Because the dissolved oxygen in the waste water is usually insufficient to support the required population of bacteria, the water must be aerated. This can be done with a surface aerating machine which has beaters extending into the waste water from above the water surface to agitate the water and incorporate air. Alternatively, air can be diffused through the bottom of the basin, e.g., through a porous medium. Surface aerators are not efficient and cause certain mechanical problems. The energy loss of diffusing air is also great and a diffused system is not suitable for installation in an existing pond.

The waste water can also be aerated by pumping through submerged tubes with Venturi openings through which air is drawn or pumped into the tubes to create turbulent mixing.

The present invention relates to an improved method and system for mixing a gas such as oxygen or air with waste water. The system includes a plurality of mixing chambers which are disposed below the surface of the waste water and through which the water is pumped from an inlet to an outlet. A suitable gas, such as oxygen or air containing oxygen, is injected into each of the mixing chambers at a step surface to form parallel streams of air and water in an extending chamber.

As the two streams move down the extending chamber, the interface between the two streams becomes unstable and waves form which attach to the sides of the chamber. This causes large frictional stresses, creating tiny bubbles which mix with the water. Since the water and air essentially flow in the same direction, no energy is wasted in turbulence and the system is energy efficient. Systems of this type are described and claimed in co-pending application Ser. No. 598,871, filed July 24, 1975.

According to an improved aspect of this system, the mixing chamber is preferably tapered in the downstream direction, first gradually and then radically, to ensure that the vortices created by the mixing do not extend out of the chamber which would reduce the efficiency of the mixing. Further, helical vanes are preferably provided in the injection passages for the gas to create greater wave generating conditions which extend the operating range of the device to greater air flow rates.

This system can be quickly and easily installed in any existing aeration pond without the need for the system to be shut down for an extended period and without the need for the pond to be drained, a project which is difficult or impossible in most instances. The system can, in fact, be installed and operating within a few minutes. In comparison with diffused air type devices and surface aeration systems, the energy required to incorporate a given amount of oxygen into the water is much less. Because little energy is wasted in turbulent mixing, the present invention is more energy efficient than are Venturi, jet or impingement type systems which depend on turbulent mixing. Further, the bubbles which are produced are tiny, thus creating a good environment for effective use of the oxygen by the bacteria within the pond or basin. Many of the other disadvantages of surface aerators and diffusion type devices are also avoided.

Other objects and purposes of the invention will be clear from the following detailed description of the drawings.

DETAILED DESCRIPTION OF THE DRAWINGS

Figure 1:
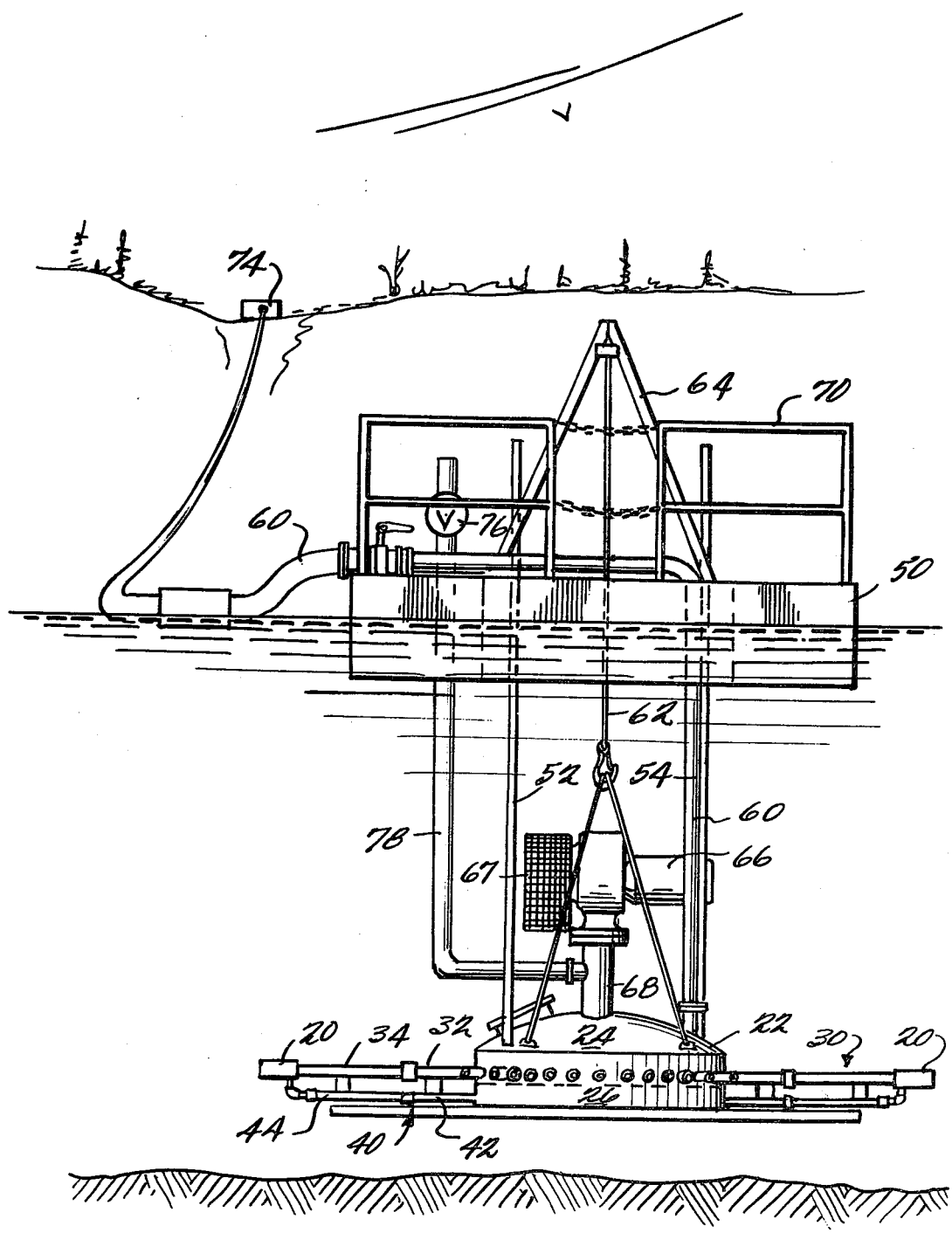
FIG. 1 shows a schematic side view of the system of the present invention in use.
Figure 2:
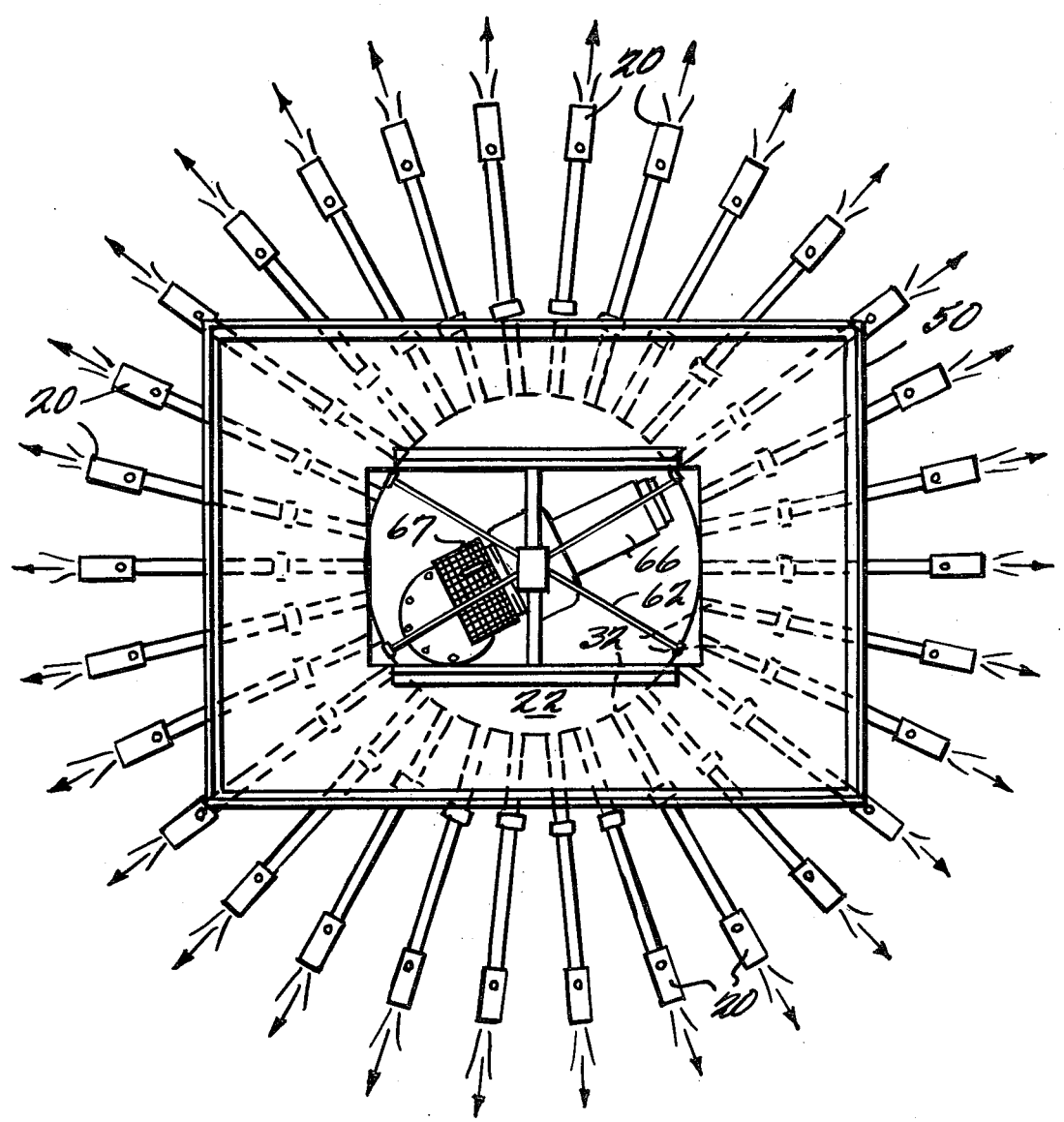
FIG. 2 shows a planar view of the system of FIG. 1.

Reference is now made to FIGS. 1 and 2 which schematically illustrate one embodiment of the present invention. In the embodiment of FIGS. 1 and 2, a plurality of circumferentially disposed mixing chambers 20, each preferably identical to the other, are circularly disposed around a dome manifold 22 which includes an upper section 24 into which water is pumped and a lower section 26 connected to a source of air or oxygen at a suitable pressure. Each of the mixing chambers is of the type shown in detail in FIGS. 3-5 and discussed in detail below.

A plurality of conduits 30, each formed of a metal segment 32 and a plastic segment 34, connect section 24 to each mixing chamber 20 so that water is continuously pumped through each chamber 20. A similar series of conduits 40, each formed of a metal portion 42 and a plastic portion 44, connect section 26 to each of the mixing chambers 20. Each of the mixing chambers 20 forms parallel streams of air and gas which interact within an extending passage in the mixing chamber to form tiny bubbles which efficiently mix with the pumped waste water as it passes between an inlet and outlet.

Manifold 22 is suspended from a fibreglass floating work platform 50 by means of guide bars 52, 54 and two bars behind bars 52 and 54 in FIG. 1. Industrial air piping conduit 60 is attached to guide bar 54 for supplying air to section 26. Cable 62 connects the manifold 22 to a frame 64 on platform 50 for lifting manifold 22 and holding manifold 22 in position for maintenance.

Conventional submerged pump 66 is mounted above manifold 22 and includes a self-cleaning strainer basket 67 over the pump intake which keeps most debris from entering the pump. For many installations the basket can be omitted and the debris which collects in the pump back-flushed as described below. When a basket is used, the small particles which accumulate on the outside of basket 67 are removed by back-flushing. Conduit 68 connects pump 66 to section 24.

Platform 50 is provided with suitable railings 70 of a height so that the unit can be lifted to a level for convenient work on the mixing chambers 20 and pump 66. An on-shore air pump 74 is schematically shown as connected to line 60 for pumping air, oxygen or other gas to section 26 for mixing with the pumped waste water.

When it is desired to clean the particles and debris which can accumulate on basket 67, within pump 66 and within mixing chamber 20, pump 66 can simply be turned off while the air pump 74 continues forcing air into mixing chambers 20. Surprisingly, instead of moving out of the outlet of each chamber, the air will pump waste water back through the inlet opposite to the direction of flow during aeration, through conduits 34 and 32 into section 24, through conduit 68, and through pump 66 blowing off the debris which has accumulated on the outside of the strainer basket 67. This aspect of the invention is claimed in co-pending application Ser. No. 863,587, filed Dec. 22, 1977. This back-flushing occurs because the water pressure at the level of the strainer basket is lower than the water pressure at the level of the mixing chambers 20.

Alternatively, flushing can be accomplished by operating a valve 76 in a line 78 which connects to conduit 68. The debris will now be blown into the air and since the pressure differential is greater, the force produced by the air which creates a slugging action will blow the debris through the system and back-flush all of the material in a few minutes.

Figure 3:
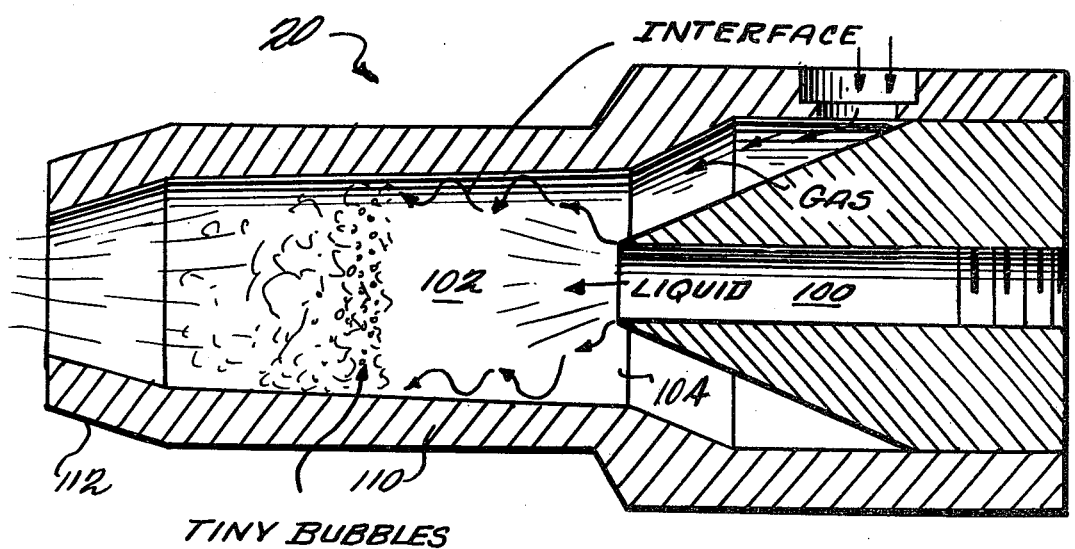
FIG. 3 shows a sectional view of a mixing chamber of the present invention without helical vanes.
Figure 4:
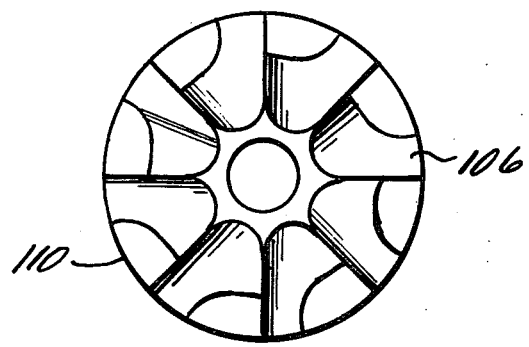
FIG. 4 shows a front view of a mixing chamber with helical vanes.
Figure 5:
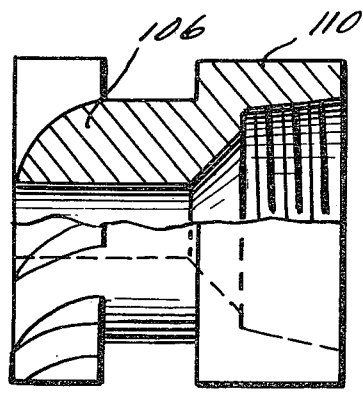
FIG. 5 shows a partial sectional view of the mixing chamber of FIG. 4.

FIGS. 3–5 illustrate two embodiments of the unique mixing chamber 20 of the present invention. Waste water flows from the inlet through passage 100 into the extending chamber 102. As the intersection between passage 100 and chamber 102, a step surface 104 is provided which includes gas passages. The passages inject gas at an angle between roughly 11 and 22-½°. To keep the vortices within extending chamber 102 at high air pressures, a chamber 110 with helical vanes 106 in the passages as shown in FIGS. 4 and 5 creates greater wave generating conditions, as the water enters an extending chamber (not shown) similar to the chamber 102 shown in FIG. 3.

Thus, two parallel streams of gas and waste water are created as shown in FIG. 3. As the streams move along the chamber 102, the friction between them causes waves to form and air thus trapped in the waves to disperse into tiny bubbles. Since the air and gas streams move in the same direction, effective mixing is achieved at minimum energy consumption. It is desirable that under most conditions the mixing take place within chamber 102 and for that reason the chamber is slightly tapered inwardly within the section 110 with the cross-section decreasing in the direction from inlet to outlet and more radically tapered inwardly within section 112 at a rate greater than for section 110. These tapers extend the maximum air flow rate with which the system will operate by several times without substantial loss of efficiency.

The helical guide vanes 106 provide a twisting motion to the air and thus create more waves which also help the interface break up more quickly by creating instability.

The mixing chambers can be made of any suitable materials such as stainless steel, aluminum or plastic.

Figure 6:
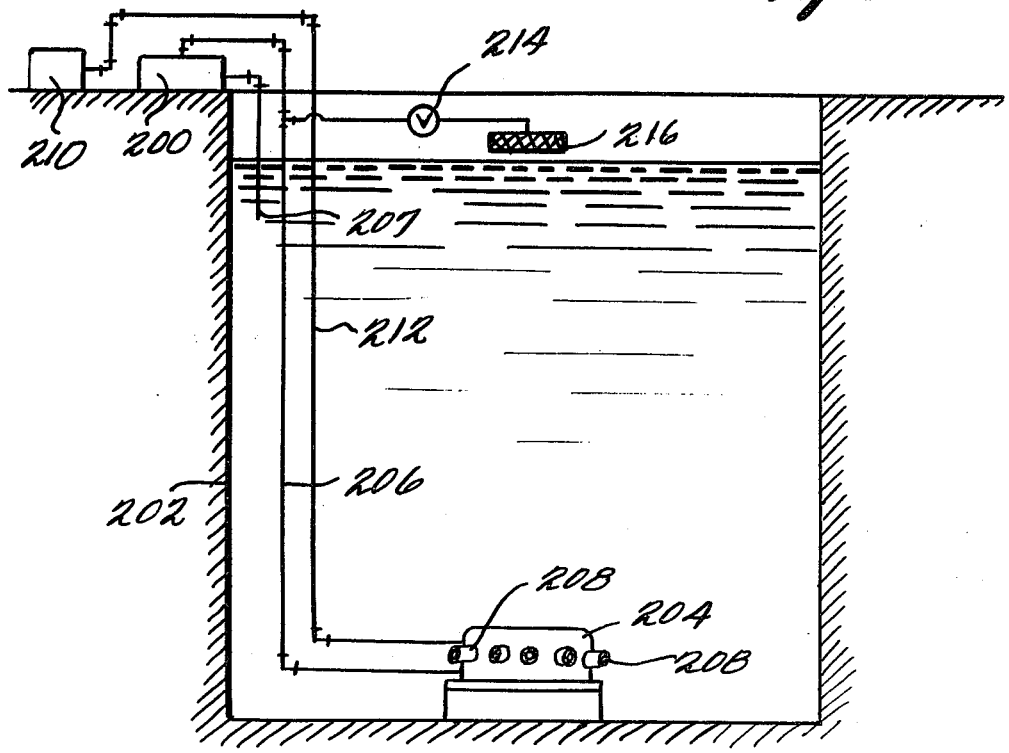
FIG. 6 shows a schematic view of another embodiment.

FIG. 6 shows another embodiment in which the submersible pump is replaced with a conventional waste water pump 200 mounted beside tank 202 and connected to manifold 204 by line 206. Pump 200 has an inlet 207. A plurality of mixing chambers 208 are mounted about manifold 204. Air pump 210 is also mounted beside tank 202 and is connected to manifold 204 by line 212. Valve 214 can be opened to back-flush waste water as described above while pump 200 is turned off and pump 210 continues to force gas into the mixing chambers 208. The gas then pumps the waste water back through manifold 204 and line 212 where it leaves via valve 214. The waste water returns to the tank and the debris is caught in a strainer 216 if desired.

Figure 8:
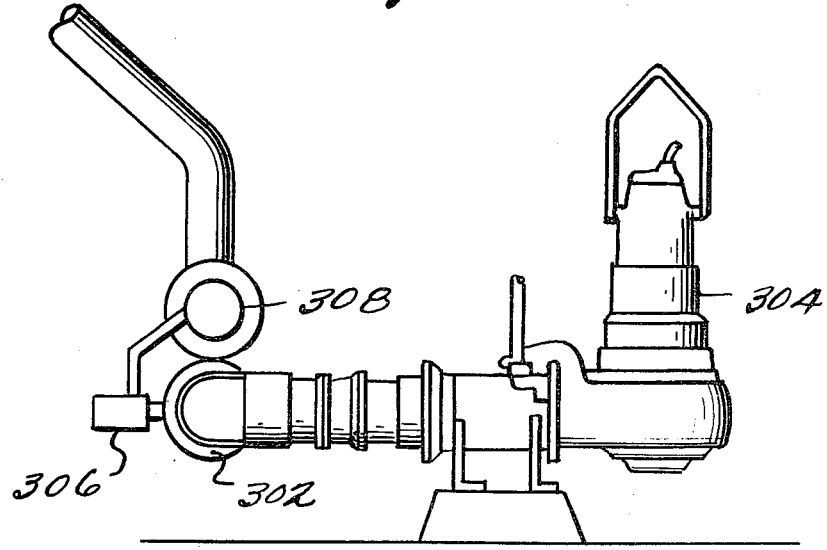
FIGS. 7 and 8 show a further embodiment.
Figure 7:
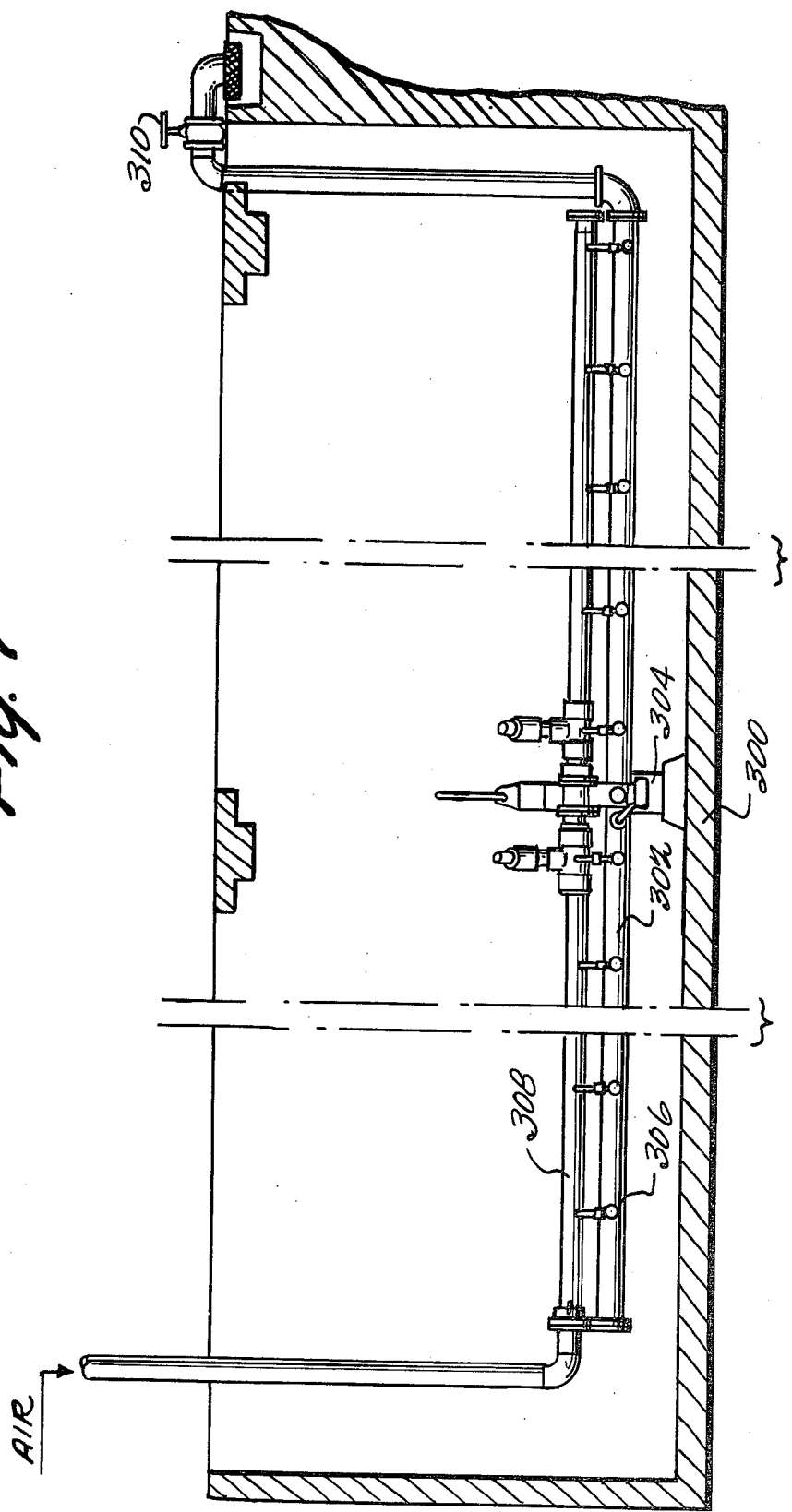

FIGS. 7 and 8 illustrate yet another embodiment of the invention which utilizes mixing chambers as described above. In the arrangement of FIGS. 7 and 8, water in a suitable tank 300 is pumped through a straight line pipe 302 by a pump 304. A plurality of mixing chambers 306 extend outwardly from pipe 302 at separated locations as shown in FIG. 7. Air is supplied to a second pipe 308 which extends above and parallel to pipe 302. Alternatively, one pipe can be within the other. Pipe 308 is connected to the individual mixing chambers for injecting air into those chambers. Pipes 302 and 308 preferably extend along the center of the tank 300 parallel to the edges so as to cause a favorable pattern of water flow from one side to the other using a minimum amount of energy to create maximum flow and aeration. The system is flushed by opening valve 310 while pump 304 is turned off and air continued to be supplied to chambers 306.

Many changes and modifications in the above described embodiments of the invention can, of course, be carried out without departing from the scope of the invention. The system can be used with nonaqueous liquids and gas other than air, such as pure oxygen, can be added. Accordingly, that scope is intended to be limited only by the scope of the appended claims.

What is claimed is:

1. A system for aerating waste water comprising:
means for containing a body of water;
at least one mixing chamber for providing a waste water passage, including:
an extending chamber,
a liquid passage of guiding waste water flow into said extending chamber, the cross-sectional area of the liquid passage at the connection of said extending chamber being less than the cross-sectional area of said extending chamber at that connection so as to form a step surface, and said extending chamber having a first section tapering inwardly at a first rate in the direction away from said connection, and a second section extending from said first section and tapering inwardly at a rate greater than said first rate to maintain vortices within said extending chamber,
means defining at least one gas passage terminating in said step surface for injecting gas into said extending chamber, to form parallel gas and water streams, said extending chamber extending downstream from said gas passage for confining flow of the parallel gas and water streams for a distance until the interface between said streams becomes unstable in said chamber and vortices are tripped to produce gas bubbles which are mixed with the water stream;
means for pumping said waste water through said at least one mixing chamber;
means for mounting said mixing chamber below the surface of said body of water; and
means for injecting an aerating gas into waste water within said mixing chamber.

2. A system as in claim 1, including at least one helical vane disposed in each said gas passage for keeping the mixing within the extending chamber.

3. A system as in claim 1, wherein said pumping means includes a water pump, and a first straight line pipe in said body connected to said pump and having a plurality of said chambers extending outwardly therefrom and said injecting means includes a second straight line pipe in said body extending parallel to said first pipe and connected to said gas passages for supplying said gas thereto.

4. A system as in claim 3, wherein said containing means is a tank and said pipes extend in the center of said tank.

5. A system as in claim 1, wherein said injecting means includes a pump outside said body and means for connecting said pump to said gas passages of said mixing chambers.

6. A system as in claim 1, further including a manifold separated into a first section connected to said pumping means and to said inlets and a second section connected to said gas passages and to said gas supplying means, said chambers extending radially outward from said first section.

7. A system as in claim 6, including means for mounting said pumping means above said manifold in said body, said pumping means having an inlet in said body.

8. A system as in claim 7 including a strainer basket over the inlet of said pumping means.

9. A system as in claim 7, wherein said connecting means includes a conduit between said pumping means and manifold.

10. A system as in claim 7, further including a floating work platform and means for suspending said manifold and said pumping means from said platform.

11. A system as in claim 7, including a plurality of first conduits each connecting said first section to one of said chambers and a plurality of second conduits each connecting said second section to one of said gas passages.

12. A system as in claim 7, wherein said chamber includes a step surface at which said gas passages terminate to produce parallel streams of gas and fluid in said passage.

* * * * *